US010933696B2

(12) United States Patent
Colombo et al.

(10) Patent No.: US 10,933,696 B2
(45) Date of Patent: Mar. 2, 2021

(54) CAR TYRE

(71) Applicant: PIRELLI TYRE S.P.A., Milan (IT)

(72) Inventors: Gianfranco Colombo, Milan (IT); Roberto Bolzoni, Milan (IT); Stefano Bizzi, Milan (IT); Daniele Lorenzetti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 677 days.

(21) Appl. No.: 14/392,228

(22) PCT Filed: Jul. 16, 2014

(86) PCT No.: PCT/IB2014/001333
§ 371 (c)(1),
(2) Date: Dec. 23, 2015

(87) PCT Pub. No.: WO2015/008137
PCT Pub. Date: Jan. 22, 2015

(65) Prior Publication Data
US 2016/0193880 A1    Jul. 7, 2016

(30) Foreign Application Priority Data

Jul. 16, 2013   (IT) .............................. RM2013A0422

(51) Int. Cl.
*B60C 11/03*     (2006.01)
*B60C 11/13*     (2006.01)

(52) U.S. Cl.
CPC ........ *B60C 11/033* (2013.01); *B60C 11/0304* (2013.01); *B60C 11/0306* (2013.01);
(Continued)

(58) Field of Classification Search
CPC ............ B60C 11/0304; B60C 11/0306; B60C 11/0318
(Continued)

(56) References Cited

U.S. PATENT DOCUMENTS 7,387,696 B2    6/2008   Sejalon
8,281,830 B2 *   10/2012   Ebiko ................. B60C 11/0302
152/209.2
(Continued)

FOREIGN PATENT DOCUMENTS

DE     102012201004 A1    10/2012
EP       0671288 A1    9/1995
(Continued)

OTHER PUBLICATIONS

English machine translation of JP2012006414 (Year: 2012).*
(Continued)

*Primary Examiner* — Robert C Dye
(74) *Attorney, Agent, or Firm* — Steinfl + Bruno LLP

(57) ABSTRACT

A tyre having a tread is described. The tyre has a central portion located across an equatorial plane, a first shoulder portion located towards an outer side of the tyre and a second shoulder portion located towards an inner side of the tyre. The central portion is separated from the first shoulder portion by two first circumferential grooves. The first shoulder portion and the second shoulder portion have a plurality of first transverse grooves having a first end located substantially at the respective edge of the tread, having a width greater than or equal to about 4 mm and an axial extension equal to at least 50% of the width of the shoulder portion in which they are located.

19 Claims, 7 Drawing Sheets

(52) U.S. Cl.
CPC ....... *B60C 11/1392* (2013.01); *B60C 11/0318* (2013.01); *B60C 2011/036* (2013.01); *B60C 2011/0341* (2013.01); *B60C 2011/0348* (2013.01); *B60C 2011/0353* (2013.01); *B60C 2011/0355* (2013.01); *B60C 2011/0365* (2013.01)

(58) Field of Classification Search
USPC .................................................. 152/209.27
See application file for complete search history.

(56) References Cited

U.S. PATENT DOCUMENTS

| | | | |
|---|---|---|---|
| 9,016,338 B2 | 4/2015 | Ishida | |
| 2003/0019555 A1* | 1/2003 | Nakagawa | B60C 11/0302 152/209.18 |
| 2009/0266457 A1* | 10/2009 | Kojima | B60C 11/0318 152/209.8 |
| 2010/0294409 A1* | 11/2010 | Bolzoni | B60C 11/0306 152/209.18 |
| 2012/0145295 A1* | 6/2012 | Yamada | B60C 11/0306 152/209.22 |
| 2012/0273104 A1* | 11/2012 | Ishida | B60C 11/04 152/209.18 |
| 2013/0000805 A1* | 1/2013 | Oodaira | B60C 11/11 152/209.18 |
| 2015/0328931 A1* | 11/2015 | Guerinon | B60C 1/0016 152/209.5 |

FOREIGN PATENT DOCUMENTS

| | | | |
|---|---|---|---|
| EP | 1674293 A2 | | 6/2006 |
| EP | 2554402 A1 | | 2/2013 |
| JP | S63159110 A | | 7/1988 |
| JP | 2005297880 A | | 10/2005 |
| JP | 2009143450 A | | 7/2009 |
| JP | 2012006414 | * | 1/2012 |
| JP | 2013078984 | * | 5/2013 |

OTHER PUBLICATIONS

English machine translation of JP2013078984 (Year: 2013).*
English machine translation of JP63-159110 (Year: 1988).*
International Search Report for International Application No. PCT/IB2014/001333 filed Jul. 16, 2014 on behalf of Pirelli Tyre S.P.A. dated Dec. 15, 2014.
Written Opinion for International Application No. PCT/IB2014/001333 filed Jul. 16, 2014 on behalf of Pirelli Tyre S.P.A. dated Dec. 15, 2014.
Extended European Search Report for EP Application No. EP19204479 filed on Jul. 16, 2014 on behalf of Pirelli Tyre S.P.A. dated Dec. 17, 2019 2 pages.
Extended European Search Report for EP Application No. EP19204496 filed on Jul. 16, 2014 on behalf of Pirelli Tyre S.P.A. dated Dec. 16, 2019 2 pages.

* cited by examiner

CAR TYRE

CROSS REFERENCE TO RELATED APPLICATIONS

The present application is the US national stage of International Application PCT/IB2014/001333 filed on Jul. 16, 2014, which, in turn, claims priority to Italian Patent Application RM2013A000422 filed on Jul. 16, 2013.

The present invention relates to a car tyre, particularly to a high or ultra high performance car tyre.

The car tyres have a tread provided with blocks delimited by circumferential grooves extending in a substantially longitudinal direction, and transverse grooves extending in a substantially axial direction. The intersection of said grooves results in blocks shaped according to various, suitably conceived, shapes and arranged along circumferential rows placed side by side, each included between two subsequent circumferential grooves.

The circumferential grooves may affect the directionality and stability characteristics of the tyre travelling with respect to the side (drift) thrusts directed parallel to the axis of rotation of the tyre.

The transverse grooves, in turn, may affect the traction characteristics of the tyre, i.e. its ability to transmit to the road surface the tangential thrusts parallel to the running direction, during acceleration and braking phases.

When driving on a wet road surface, the circumferential and transverse grooves may also affect the water drainage in the contact patch (footprint area).

The Applicant has noticed that a number of transverse grooves having an accentuated width improves the traction, especially on wet road surfaces, also providing a good flexibility of the blocks, but the overuse thereof can endanger the performance on dry road surfaces and increase the tyre noise, especially if the number of transverse grooves having an accentuated width is provided at the tyre shoulders. In fact, the ridges of the blocks and/or of the grooves continuously collides one after the other against the road surface thereby causing the most noise.

To be able to keep up a high safety standard under all circumstances, the tyre must have, in addition, excellent brake performances (both on dry and wet surfaces) as well as great aquaplaning resistance: two characteristics in conflict with each other because, to have a good amount of tyre on the ground thereby improving the brake performance, a low void-to-rubber ratio is required, whereas to provide a good water drainage a suitable number and especially a proper width of the grooves are required (i.e. a high void-to-rubber ratio).

Further, a relatively high void-to-rubber ratio can increase the noise and the wear of the tyre.

As regards the driveability, the Applicant noticed that vehicle masses have to be balanced; generally, in order to improve the cornering stability and speed, the most recent cars, and particularly the rear-wheel-drive sport cars, have a suspension system characterized at the rear axle by the use of high camber angles.

Further, the Applicant noticed that such a characteristic affects the shape of the tyre footprint. FIG. 1 shows, by way of example, the footprint or contact patch of a conventional tyre mounted on the left front wheel of a rear-wheel-drive vehicle. As it can be seen, during travelling in a straight stretch or when stationary, the footprint area has a substantially trapezoidal or triangular shape tapering toward the outer side of the vehicle.

The Applicant noticed that sport cars, especially the rear-wheel-drive ones, mounting tyres characterized by a footprint area similar to that shown in FIG. 1, if subjected to sudden accelerations, can have the rear axle oversteering or have a transitory zigzag motion caused by the loss of grip of the rear axle.

The Applicant believes that such a behavior is at least partly caused by the fact that, if the tyres are subjected to sudden accelerations and/or during cornering, being therefore subjected to high and/or sudden load transfer, the inner side of the tyre can undergo an excessive decrease of the load and its outer side can undergo an excessive increase of the load resulting in an excessive and too sudden change in the tyre footprint.

The Applicant realized that, in order to reduce or prevent the loss of grip during cornering resulting in sudden load transfers, the footprint area have to be prevented from deforming up to concentrate almost solely on the outer side of the tyre. The Applicant has therefore considered providing a tread pattern that, during cornering with sudden load transfer, allows the footprint area to be as much as possible gradually and increasingly deformed towards a footprint shape at the most substantially mirrored with respect to that in FIG. 1, that is longer on the outer side of the tyre and tapered on the inner side (but without the total loss of grip).

Furthermore, the tread pattern should have to guarantee good traction/braking performances both on wet surface and dry surfaces, low noise and rolling resistance, wear evenness and wear resistance.

The Applicant found that a tread pattern able to solve the above explained mutually conflicting problems comprises a low void-to-rubber ratio in the central area and comprises shoulder portions having a lower block mobility on the shoulder portion facing the outer side of the car with respect to the block mobility of the shoulder portion facing the inner side of the car.

An aspect of the present invention relates to a car tyre having a tread comprising a central portion located across an equatorial plane, a first shoulder portion located towards the outer side of the tyre and a second shoulder portion located towards the inner side of the tyre.

The central portion is separated from the first shoulder portion by two first circumferential grooves.

The first shoulder portion and the second shoulder portion comprise a plurality of first transverse grooves having a first end located substantially at the respective edge of the tread, having a width greater than or equal to about 4 mm and an axial extension equal to at least 50% of the width of the shoulder portion in which they are located.

The number of said first transverse grooves of the first shoulder portion is lower than the number of said first transverse grooves of the second shoulder portion.

The central portion comprises at least one circumferential rib comprising a plurality of second transverse grooves.

The second transverse grooves have a maximum width smaller than or equal to about 3 mm and define, in said at least one circumferential rib, a void-to-rubber ratio smaller than or equal to about 0.06, preferably smaller than or equal to about 0.05.

The small void-to-rubber ratio of the rib or ribs of the central portion, together with the small size of the transverse grooves, give the tread band a high structural consistency in such an area, thereby providing the tyre with excellent performances of driveability and quick traction response. Furthermore, the high amount of tyre on the ground provides for excellent brake performances on a dry road surface, as well as low noise and low rolling resistance. The circumferential grooves provide for good performances travelling on wet road surfaces.

At the same time, a different stiffness of the shoulder portions and, in particular, the greater stiffness at the portion facing the outer side of the tyre, counteracts an excessive deformability of such portions, and thus excessive change of the footprint area when the vehicle is subjected to sudden load transfers (in particular during cornering), such that, even in critical situations, at least part of the inner side of the tread rests on the ground, thereby promoting the stability and safety of the vehicle itself.

In the context of this description, the following definitions are adopted:

By "equatorial plane" of the tyre is meant a plane perpendicular to the rotation axis of the tyre and dividing the tyre into two symmetrically equal parts.

By "outer side of the tyre" is meant the tyre side facing the outside of the vehicle on which the tyre is mounted.

By "inner side of the tyre" is meant the tyre side facing the vehicle on which the tyre is mounted.

By "circumferential" or "longitudinal" direction is meant a direction generally pointing to the direction in which the tyre rotates or anyway slightly tilted with respect to the direction in which the tyre rotates.

By "axial direction" or "axially" is meant a direction generally parallel to, or anyway slightly tilted, with respect to the axis of rotation of the tyre.

By "radial direction" or "radially" is meant a direction substantially orthogonal to the axis of rotation of the tyre.

By "depth" of a groove is meant the depth of the groove measured in a direction substantially orthogonal to the bottom of the groove up to its radially outermost edges.

By "width" of a groove is meant the width detected with reference to the width of the radially outer edges of the groove.

By "void-to-rubber ratio" is meant the ratio between the total area of the grooves of a determined portion of the tyre tread pattern intended to rest on the ground (possibly of the whole tread pattern) and the total area of the same portion of the tread pattern (possibly of the whole tread pattern).

By axial extension of a groove or a portion thereof is meant the length of its projection measured along an axial direction.

By inclination of a groove or a segment thereof is meant the angle of the groove with respect to a direction parallel to the equatorial plane of the tyre; for each groove portion, such an angle refers to the angle (having an absolute value between 0° and 90°) formed by a rotation from a direction parallel to the equatorial plane up to the direction tangent to the groove passing through such a portion.

By module of the tread pattern is meant a minimum portion of the tread pattern repeated in succession and substantially unchanged along the whole circumferential extension of the tread band itself. Although modules keep the same pattern shape, they may have different circumferential extensions.

In the above said aspect, the present invention may have at least one of the hereinafter described characteristics.

Preferably, for each module of the tread pattern the number of first transverse grooves of the second shoulder portion may be about twice the number of the first transverse grooves of the first shoulder portion.

Advantageously, the second transverse central grooves may have a first straight segment extending over at least 50%, preferably at least 70%, of the total extension of the second transverse grooves. Preferably, said first substantially straight segment has an inclination $\alpha \geq 45°$ relative to the equatorial plane.

Conveniently, the first straight segment has an inclination $\alpha < 90°$ relative to the equatorial plane, e.g. between 60° and 90°.

Advantageously, the first straight segment of the second transverse grooves has an extension smaller than 95% of the total extension of the second transverse grooves.

The extension and inclination of the first segment provide the circumferential rib or the concerned block with a good flexibility, thereby providing the tyre with good brake/traction performances.

Conveniently, the second transverse grooves have a second, preferably straight segment extending at most over 20% of the total extension of the second transverse grooves. Said second segment is preferably counter-inclined relative to the first segment (i.e. it has an opposed inclination relative to the first segment).

Preferably, for each module of the tread pattern, the number of second transverse grooves in an area of the central portion facing the inner side of the tyre is greater than the number of second transverse grooves in an area of the central portion facing the outer side of the tyre.

Advantageously, the central portion can have at least two second circumferential grooves.

Preferably, the central portion can have three circumferential ribs, each comprising a plurality of blocks circumferentially defined by the second transverse grooves.

Alternatively, the central portion can have two circumferential ribs comprising a plurality of blocks circumferentially defined by the second transverse grooves and a circumferential rib comprising a plurality of second transverse grooves having an axial extension smaller than 80% of the width of the circumferential rib itself.

In this embodiment, the circumferential rib comprising the plurality of second transverse grooves having an extension smaller than 80% of the width of the circumferential row, is preferably located closer to the second shoulder portion of the tyre, i.e. the one facing the inner side of the tyre, with respect to the rest of the ribs.

Advantageously, the second transverse grooves can be located at a distance of between 25 mm and 80 mm in circumferential direction. Preferably, in at least one circumferential rib of the central portion, the second transverse grooves are located at a distance of between 40 mm and 80 mm in circumferential direction.

Conveniently, the distance between the second transverse grooves in the circumferential rib of the central portion closest to the inner side of the tyre is smaller than the distance between the second transverse grooves of the rib of the central portion closest to the outer side of the tyre.

Advantageously, each circumferential rib of the central portion has its own void-to-rubber ratio. Preferably, said void-to-rubber ratio is greater in the rib closest to the second shoulder portion.

Conveniently, the second circumferential grooves have a width greater than 12 mm.

Preferably, the first and/or the second circumferential grooves have a maximum depth greater than 5 mm.

Advantageously, the first and/or second circumferential ribs have a large right section having a substantially trapezoidal or rectangular shape.

The first circumferential grooves comprise a first circumferential groove facing the outer side of the tyre and a first circumferential groove facing the inner side of the tyre, the first circumferential groove facing the outer side of the tyre having a width smaller than the width of the first circumferential groove facing the inner side of the tyre, thereby increasing the structural stiffness and resisting the strong lateral forces.

Preferably, the tread has a third groove located on the first shoulder portion.

Advantageously, the third circumferential groove can have a width smaller than 4 mm.

Advantageously, the third circumferential groove can have a depth smaller than 4 mm.

More characteristics and advantages of the invention will be now illustrated referring to the embodiments shown by way of non-limiting example in the accompanying figures, in which.

Figure 1:
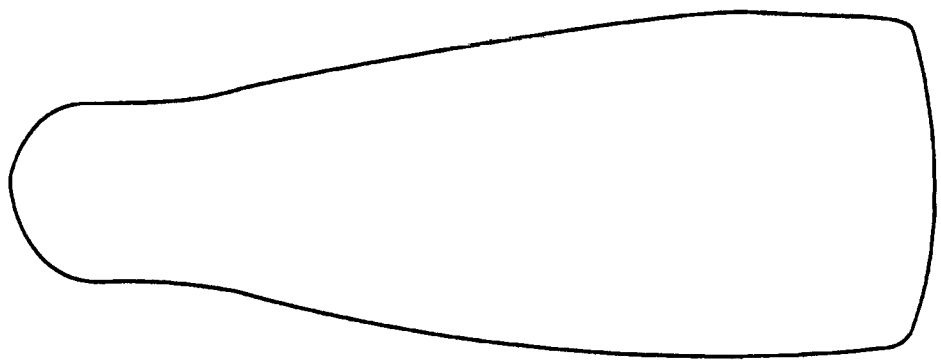
FIG. 1 is a schematic view of a footprint area of a tyre (in particular a rear tyre) mounted on a sport car having a suspension system with a high camber angle.
Figure 2:
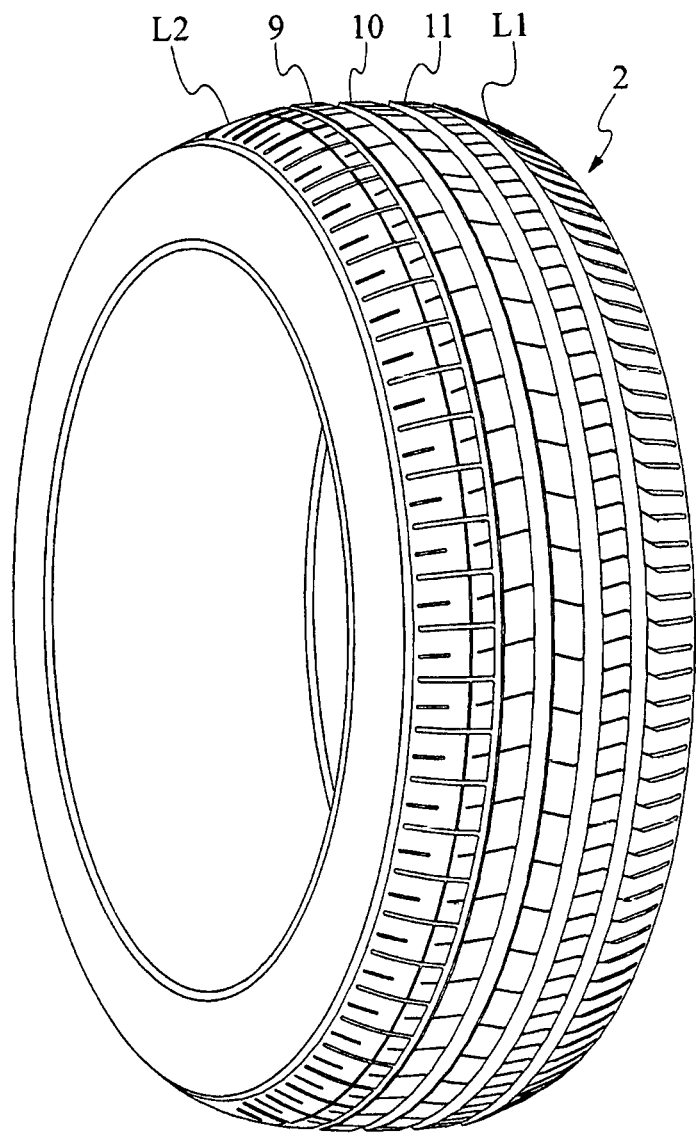
FIG. 2 is a perspective view of a tyre having a tread made according to an example of the invention.

In FIGS. 2-7, a tyre 1 having a tread 2 according to the present invention is shown.

The tyre 1 has a conventional structure and comprises a carcass, a tread band placed at the crown of the carcass, a pair of axially opposite sidewalls ending in beads reinforced with bead cores and respective bead fillers. The tyre preferably also comprises a belt structure interposed between the carcass and the tread band. The carcass is reinforced by one or more carcass plies anchored to the bead cores, whereas the belt structure comprises two radially and mutually overlapped belt strips. The belt strips are formed by parts of rubberized fabric encasing metal cords, parallel to each other in each strip and crossing those of the adjacent strips, preferably symmetrically inclined with respect to the equatorial plane. Preferably, the belt structure also comprises a third belt layer, which is placed in a radially outermost position and provided with cords substantially parallel to the equatorial plane.

The tyre 1 preferably has a H/C ratio, between the height of the right section and the maximum width of the section, of between 0.25 and 0.65. The nominal width of the section of the tyre 1 is preferably between about 195 mm and 365 mm. The rim diameter of the tyre 1 is preferably between 16 and 22 inches.

To ensure not only a long mileage but also high performances during the whole tyre life, especially as regards the driveability, the tread 2 has a comprehensively small void-to-rubber ratio, i.e. smaller than 0.35, preferably smaller than 0.32.

The tread 2 is provided with circumferential grooves 3, 4, 5, 6, extending in a longitudinal direction.

The tread 2 comprises a central portion L1, a first shoulder portion L2 located on the outer side of the tyre and a second shoulder portion L3 located on the inner side of the tyre.

First circumferential grooves 3 and 6, respectively, axially delimit the first shoulder portion L2 and the second shoulder portion L3 with respect to the central portion L1 of the tread 2.

Each first shoulder portion L2 and second shoulder portion L3 comprises first transverse grooves 56, 66, respectively.

The respective transverse grooves 56, 66 are circumferentially repeated.

The first transverse grooves 56, 66 have a width greater than or equal to about 4 mm. Preferably, the first transverse grooves 56, 66 have a width smaller than about 10 mm. For example, they can have a width between about 4 and about 8 mm.

The centerline of the respective first transverse grooves 56, 66 is transverse or slightly inclined with respect to the axial direction.

In particular, the centerline of the grooves 56 forms, with the equatorial plane X-X, an angle $\omega$ having an absolute value of between 45° and 90°.

Preferably, the angle $\omega$ is greater than 70°.

Preferably, each first transverse groove 56, 66 has a not-constant depth, preferably gradually decreasing towards the axially external edges of the tyre.

Each first transverse groove 56, 66 has a maximum depth at least equal to about 3 mm and smaller than about 10 mm. Preferably, each first transverse groove 56, 66 has a maximum depth of between about 4 mm and about 8 mm.

The first transverse grooves 56, 66 have a first end located substantially at the respective axially external edge of the tread 2 and extend from such an end in a substantially axial direction over at least 50% of the width of the shoulder portion in which they are located. In this way, the first transverse grooves 56, 66 significantly change the stiffness of the tread portions in which they are obtained, thereby affecting the overall stiffness of the shoulder portions.

Figure 4:
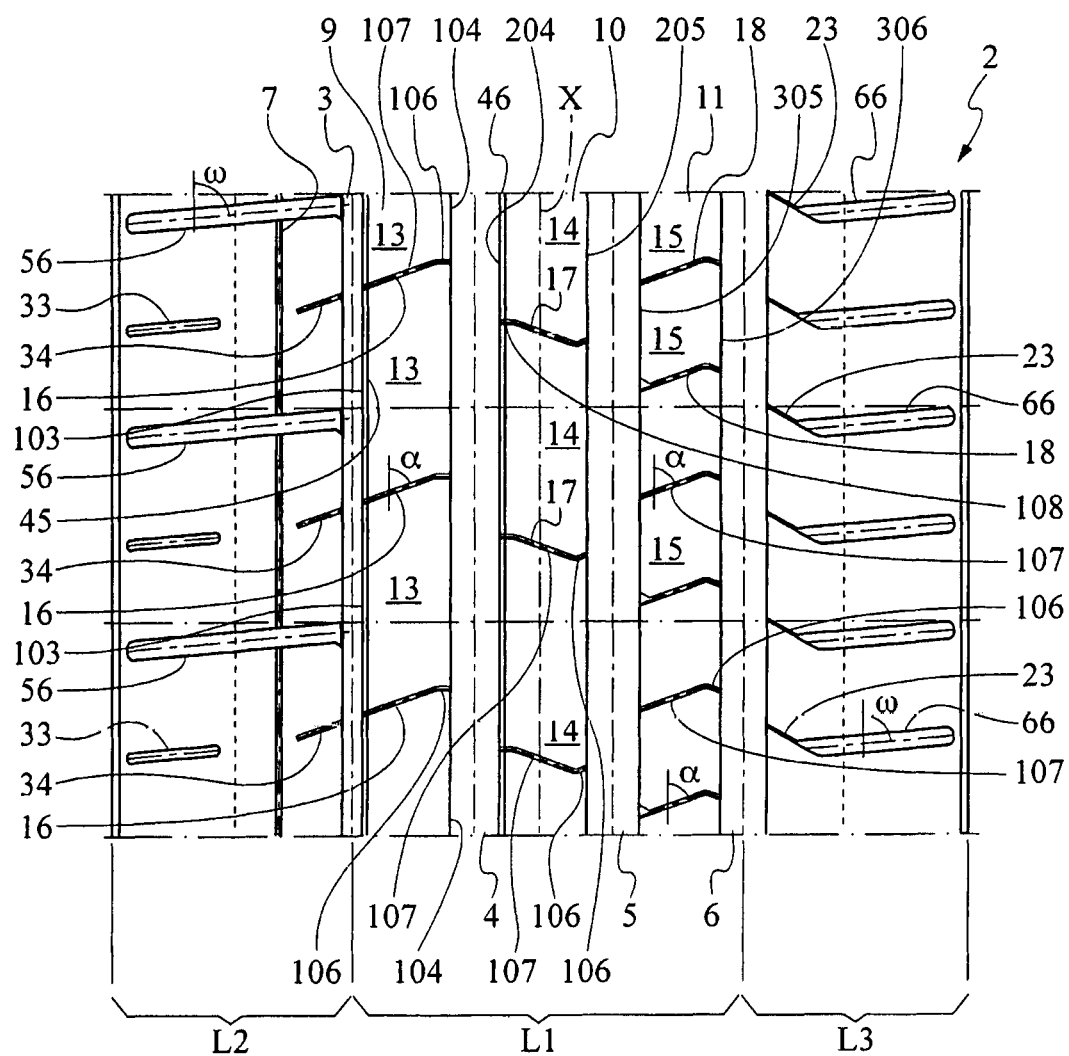
FIG. 4 is a plan view of the tyre tread of FIG. 2.
Figure 5:
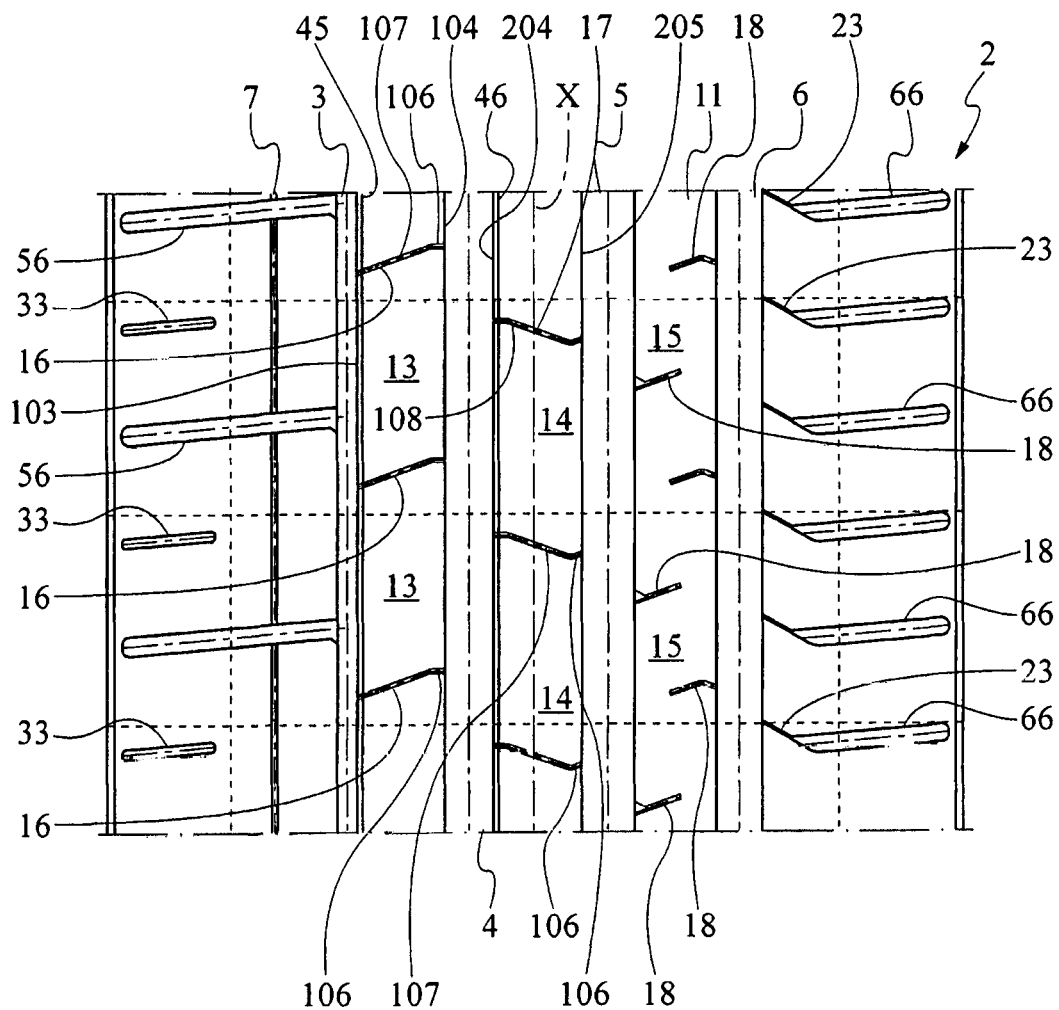
FIG. 5 is a plan view of a modification of the tread of FIG. 2.
Figure 6:
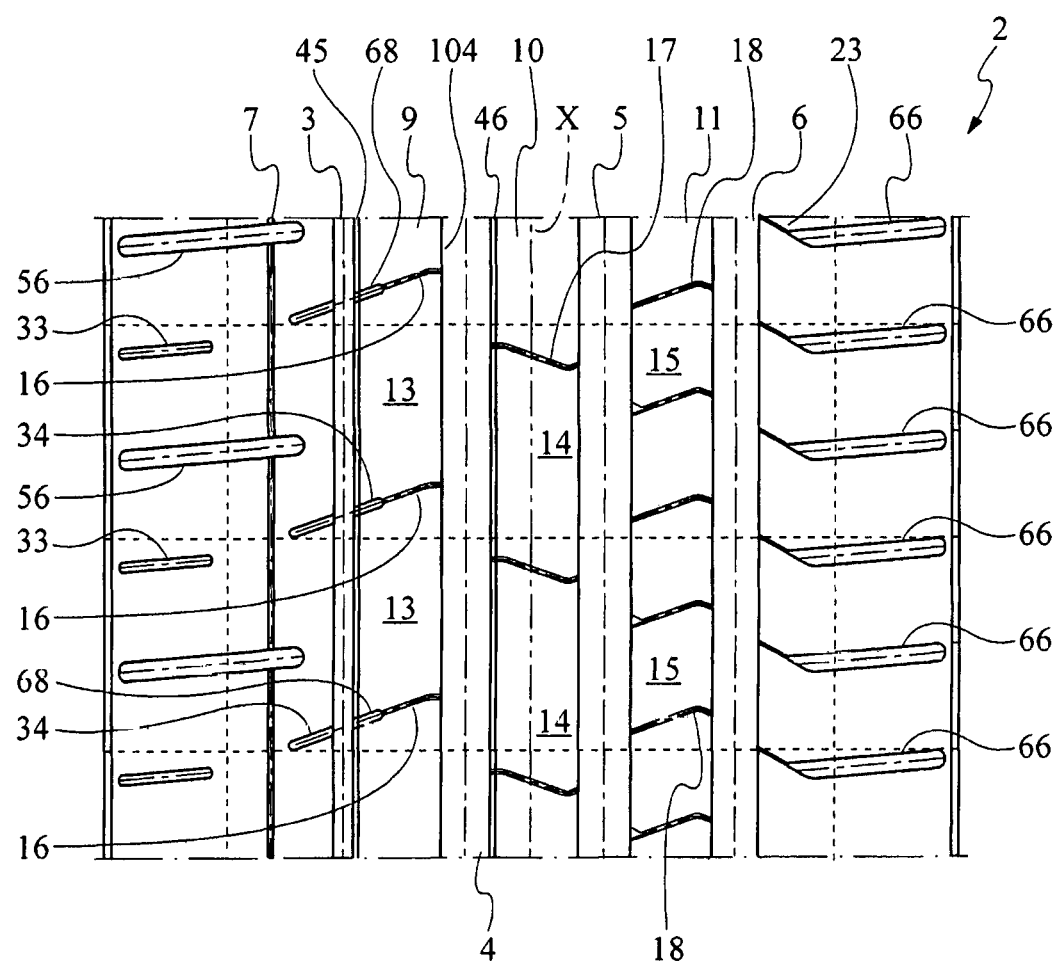
FIG. 6 is a plan view of a further modification of the tread of FIG. 2.
Figure 7:
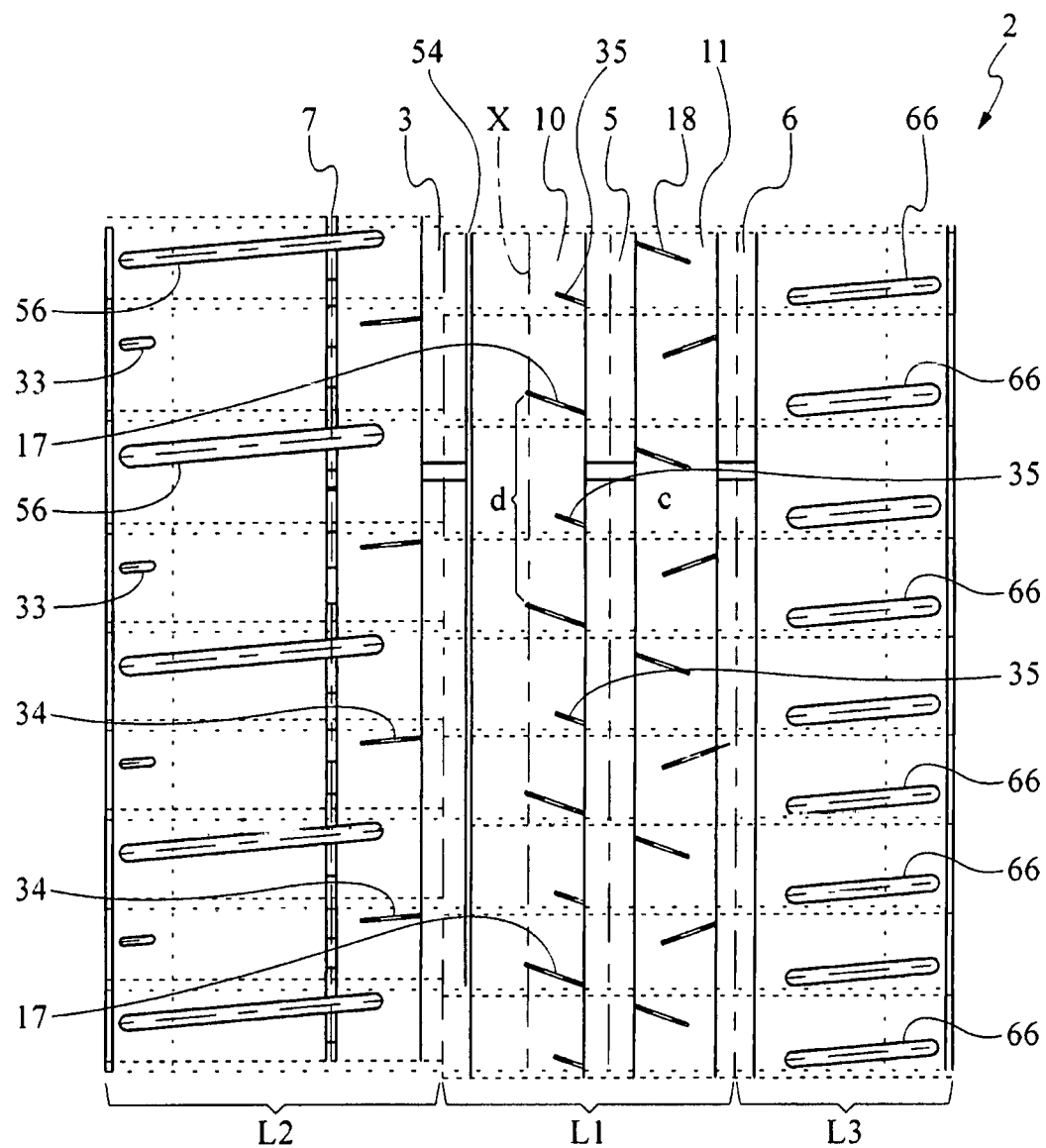
FIG. 7 is a plan view of a further modification of the tread of FIG. 2.

In the embodiments shown in FIGS. 4 and 5, the first transverse grooves 56 located in the first shoulder portion L2 extend up to the first circumferential groove 3 and open out therein, whereas in the embodiments shown in FIGS. 6 and 7, an end of the first transverse grooves 56 located in the first shoulder portion L2 is far from the first circumferential groove 3.

An end of the first transverse grooves 66 located in the second shoulder portion L3 can be far from the first circumferential groove 6 such as, for example, in the embodiment shown in FIG. 7. Conversely, in the embodiments shown in FIGS. 4, 5, 6, the first transverse grooves 66 are joined to the first circumferential groove 6 by means of sipes 23 having a maximum width smaller than 2 mm, preferably smaller than 1 mm.

The sipes 23 are preferably counter-inclined with respect to the first transverse grooves 66.

Each sipe 23 has a preferably small axial extension, preferably less than 20% of the width of the second shoulder portion L3.

Each sipe 23 may have a substantially constant depth along its extension, preferably a maximum depth smaller than 5 mm, more preferably smaller than 3 mm.

According to an aspect of the present invention, the number of first transverse grooves 56 of the first shoulder portion L2 is smaller than the number of the first transverse grooves 66 of the second shoulder portion L3. With reference to the embodiment shown in FIGS. 4-7, for each module of the tread pattern the number of first transverse grooves 66 of the first shoulder portion L3 is about twice the number of first transverse grooves 56 of the second shoulder portion L2. The ratio between the number of grooves 66 located in the first shoulder portion L3 and the number of grooves 56 located in the second shoulder portion L2 can obviously be slightly different from the exact value of two: for example by having 70 grooves located in the second shoulder portion L3, 30-40 grooves can be provided in the first portion of the shoulder.

In the embodiments shown in FIGS. 4-7, the first shoulder portion L2 also has a plurality of third transverse grooves 33.

The third transverse grooves 33 have a small depth (i.e. smaller than 3-4 mm) and a short axial extension (equal to or smaller than about 30-40%). Furthermore, they are located in the axially outermost part of the first shoulder portion L2, basically at the edge of the tread. In this way, the stiffness of the first shoulder portion L2 is not significantly affected by the third transverse grooves 33.

In the embodiments shown in the FIGS. 4, 6 e 7, the first shoulder portion L2 further has a plurality of fourth transverse grooves 34 extending over less than 20% of the width of the first shoulder portion L2.

The fourth transverse grooves 34 may extend from the first circumferential groove 3 and/or may be located on the extended centerline of the second transverse grooves 16, which will be described below.

The fourth transverse groove 34 can have a width smaller than about 3 mm, preferably smaller than about 2 mm.

In the embodiments shown in FIGS. 4-7, the first shoulder portion L2 also has a third circumferential groove 7. Such third circumferential groove 7 has a width smaller than 4 mm and a maximum depth smaller than 4 mm.

The first and the second shoulder portions L2, L3 have a small void-to-rubber ratio, in order to limit the mobility of the shoulder portions of the tyre tread.

Preferably, the first shoulder portion L2 and/or the second shoulder portion L3 have a void-to rubber ratio smaller than about 0.15, preferably smaller than about 0.10. Preferably, the first shoulder portion L2 and/or the second shoulder portion L3 have a void-to rubber ratio greater than 0.05, preferably greater than 0.06.

In the embodiments shown in FIGS. 4-6, the central portion L1 has two second circumferential grooves 4, 5 so as to form three circumferential ribs 9, 10 e 11 whereas in the embodiment shown in FIG. 7 the central portion L1 has only one circumferential groove 5 so as to form two circumferential ribs 10 e 11.

In detail, in the embodiments shown in FIGS. 4-6, a first circumferential rib 9 is between the first circumferential groove 3 and the second circumferential groove 4. A second circumferential rib 10 is between the second circumferential grooves 4 and 5. A third circumferential rib 11 is between the second circumferential groove 5 and the first circumferential groove 6.

The first shoulder portion L2 is separated from the first rib 9 by the first circumferential groove 3, whereas the second shoulder portion L3 is separated from the third rib 11 by the first circumferential groove 6.

Conversely, in the embodiment shown in FIG. 7, a first circumferential rib 10 is between the first circumferential groove 3 and the second circumferential groove 5. A second circumferential rib 11 is between the second circumferential groove 5 and the first circumferential groove 6.

The first shoulder portion L2 is separated from the first rib 10 by the first circumferential groove 3, whereas the second shoulder portion L3 is separated from the second rib 11 by the first circumferential groove 6.

The first and/or second circumferential grooves 3, 4, 5, 6 may have a width between about 5 mm and about 16 mm.

In greater detail, in the embodiments shown in FIGS. 4-6, the first circumferential groove 3 separating the central portion L1 from the first shoulder portion L2 has a width smaller than the width of the first circumferential groove 6 separating the central portion L1 from the second shoulder portion L3.

For example, the first circumferential groove 3 located towards the outer side of the tyre may have a width smaller than about 10 mm, preferably smaller than about 8 mm; the first circumferential groove 6 located towards the inner side of the tyre may have a width smaller than about 15 mm, preferably smaller than about 14 mm.

On the contrary, in the embodiment shown in FIG. 7, the first circumferential groove 3 separating the central portion L1 from the first shoulder portion L2 has a width greater than the width of the first circumferential groove 6 separating the central portion L1 from the second shoulder portion L3.

For example, according to this embodiment, the first circumferential groove 3 located towards the outer side of the tyre may have a width smaller than about 15 mm, preferably smaller than about 14 mm; the first circumferential groove 6 located towards the inner side of the tyre may have a width smaller than about 13 mm, preferably smaller than about 12 mm.

In all embodiments, the second circumferential grooves 4, 5 located in the central portion L1 have a width greater than the width of the first circumferential grooves 3, 6 located so as to separate the central portion L1 from the shoulder portions L2, L3. For example, the second circumferential grooves 4, 5 may have a width greater than about 12 mm.

The first and/or second circumferential grooves 3, 4, 5, 6 preferably have a maximum depth ranging from about 4 mm to about 11 mm, more preferably from about 5 mm to about 8 mm.

The second circumferential grooves 4, 5 and the first circumferential groove 6 can have a substantially constant width throughout their depth, in order to provide excellent drainage performances.

In other words, their groove bottom can be wide enough, comparable to the width of the groove as measured at the radially outermost surfaces of the adjacent blocks, and the inclination of their lateral walls with respect to the groove centerline can be small.

In detail, in the embodiments shown in FIGS. 4-6, the second circumferential grooves 4, 5 and the first circumferential groove 6 are formed so as to have a large right section having a substantially trapezoidal, preferably nearly rectangular, shape.

The first circumferential groove 3 located towards the outer side of the vehicle has a width gradually decreasing in a radial direction towards the groove bottom.

In other words, the right section of the first circumferential groove 3 tapers towards the groove bottom.

The first circumferential groove 3 has a width smaller than 8 mm, preferably greater than 5 mm, more preferably equal to 6 mm. The lateral wall facing the outer side of the first circumferential groove 3 has an inclination of about 15° relative to its centerline axis, whereas the opposed lateral wall can have an inclination of about 5° relative to the centerline axis.

The first circumferential groove 6 located towards the inner side of the tyre has a right section greater than the right section of the first circumferential groove 3 located towards the outer side of the tyre. Preferably, the second circumferential groove 5 located towards the inner side of the tyre has a right section greater than the right section of the second circumferential groove 4 located towards the outer side of the tyre, and the latter has a right section greater than the right section of the first circumferential groove 6 located towards the inner side of the tyre.

Conversely, in the embodiment shown in FIG. 7, the second circumferential groove 5 and the first circumferential grooves 3, 6 are formed so as to have a right section of large size, having a substantially trapezoidal shape, preferably almost rectangular.

Preferably, the second circumferential groove 5 located towards the inner side of the tyre has a right section greater than the right section of the first circumferential groove 6 located towards the inner side of the tyre.

In the embodiments shown in FIGS. 4-7, the central portion L1 comprises circumferential ribs characterized by low void-to-rubber ratios, in order to increase the "rubber/ground interface" at the central portion L1 thereby achieving excellent handling performances, low noise, low rolling resistance and wear evenness.

At least one circumferential groove 9, 10, 11 (preferably each of them) has a void-to-rubber ratio smaller than about 0.06, more preferably smaller than about 0.05.

In the central portion L1, the tread 2 shown in FIGS. 4-6 has a void-to-rubber ratio, without considering the first and second circumferential grooves 3, 4, 5, 6, smaller than about 0.06, preferably smaller than about 0.05.

In fact, in the central portion L1 the water is primarily, or almost entirely, drained by means of the circumferential grooves 3, 4, 5, 6, which have, as previously described, a width and/or depth properly sized for this purpose:

The circumferential ribs 9, 10, 11 comprise second circumferential grooves 16, 17, 18 extending, at least in one of the circumferential ribs 9, 10, 11, over at least 40%, preferably 80% of the width of the circumferential row.

The second transverse grooves 16, 17, 18 have a width smaller than or equal to about 3 mm, preferably smaller than about 2 mm.

The second transverse grooves 16, 17, 18 preferably have a maximum depth greater than 4 mm, preferably smaller than 10 mm, still more preferably smaller than 8 mm.

The second transverse grooves 16, 17, 18 are located at a distance in a circumferential direction preferably between 25 mm and 80 mm in the circumferential direction. Preferably, in at least one of the circumferential ribs 9, 10, 11, the distance is between 40 mm and 80 mm.

The embodiments shown in FIGS. 4-6, as previously disclosed, are characterized by a central portion L1 comprising three circumferential ribs 9, 10, 11.

In the embodiments shown in FIGS. 4-6, the distance d between the second transverse grooves 16, 17 located in the circumferential ribs 9, 10 is greater than the distance between the second transverse grooves 18 located in the circumferential rib 11 closest to the inner side of the tyre.

In this embodiment shown in FIGS. 4 and 6, the second transverse grooves 16, 17, 18, extend over the whole width of the circumferential ribs 9, 10, 11 such that blocks are defined on all the ribs 9, 10, 11.

In this embodiment, for each rib 9, 10, 11, the second transverse grooves 16, 17, 18 define a plurality of blocks, 13, 14, 15, respectively.

In the embodiment shown in FIG. 5, the second transverse grooves 16, 17 extend over the whole width of the ribs thereby defining blocks 13, 14 only in the first and the second circumferential ribs 9, 10. On the contrary, the second transverse grooves 18 are not extended over the whole width of the third circumferential rib 11 adjacent to the second shoulder portion L3.

In the embodiment shown in FIGS. 4-6, each block 13 of the first circumferential rib 9 is axially delimited by two segments 103 and 104 of circumferential grooves and circumferentially delimited by two second transverse grooves 16.

Each second transverse groove 16 has a centerline provided with at least one first straight segment 107 and one second straight segment 106.

The second straight segment 106 has a length substantially smaller than the length of the first segment 107. The first straight segment 107 preferably has an extension greater than 50%, and preferably smaller than 95% of the total extension of the second transverse grooves 16. The second segment 106 instead has an extension smaller than 20% of the total extension of the second transverse grooves 16.

The first segment 107 preferably has an inclination $\alpha \geq 45°$, more preferably $\alpha \geq 60°$, relative to the equatorial plane X-X.

Advantageously, the first segment 107 preferably has an inclination $\alpha < 90°$ relative to the equatorial plane X-X.

In the embodiment shown in figure, the second straight segment 106 is counter-inclined relative to the first segment 107.

The second transverse grooves 16 extend so as to be parallel to each other at least along a portion thereof. Preferably, they are substantially parallel to each other along their whole extension.

Figure 3:
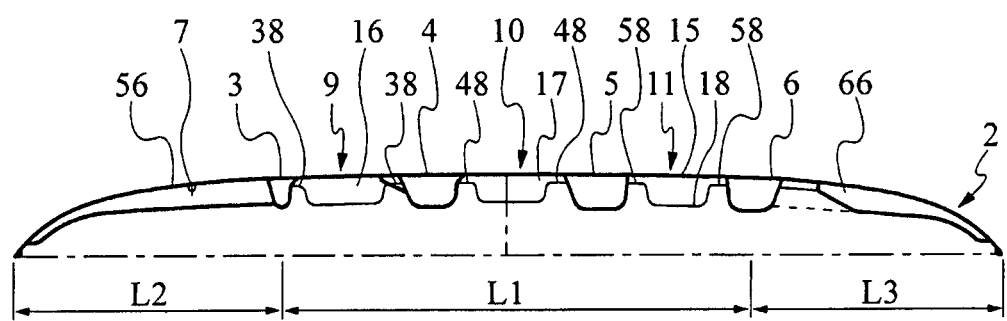
FIG. 3 is an enlarged sectional view of the tread of FIG. 2.

Preferably, the second transverse grooves 16 of the first circumferential rib 9 have a not-constant depth but a stepped profile. In other words, as shown in FIG. 3, they exhibit a central area having the maximum depth and located in the middle of the first circumferential rib 9 and two portions 38 having smaller depths and located axially external with respect to the central one. The two portions 38 with smaller depths have a short axial extension and are located next to the circumferential grooves 3 and 4.

Such stepped profile of the grooves 16 provides stiffness to the block 13 at its ridges, thereby preventing or anyway reducing the occurrence of uneven wear.

Each block 14 formed in the second rib 10 is axially delimited by two segments 204 and 205 of circumferential grooves and circumferentially delimited by two second transverse grooves 17.

Preferably, the blocks 14 formed in the groove 10 are slightly staggered in a circumferential direction with respect to the blocks 13 of the circumferential row 9.

Each second transverse groove 17 of the circumferential rib 10 has a centerline provided with at least one first straight segment 107, a second straight segment 106 and a third straight segment 108. The second straight segment 106 and the third straight segment 108 substantially have the same length.

The second straight segment 106 and the third straight segment 108 have a length substantially smaller than the length of the first segment 107. The first straight segment 107 preferably has an extension greater than 50%, and preferably smaller than 95% of the total extension of the second transverse grooves 17.

The first segment 107 preferably has an inclination $\alpha \geq 45°$, more preferably $\alpha \geq 60°$, relative to the equatorial plane X-X.

Advantageously, the first segment 107 preferably has an inclination $\alpha < 90°$ relative to the equatorial plane X-X.

The second segment 106 and the third segment 108 have instead an extension smaller than 20% of the total extension of the second transverse grooves 17.

The second segment 106 is located at an end of the first segment 107 and the third segment 108 is located at the axially opposed end of the first segment 107.

In the embodiment shown in FIGS. 4-6, the second straight segment 106 is counter-inclined with respect to the first segment 107 and also the third segment 108 is counter-inclined with respect to the first segment 107.

Furthermore, the first straight segment 107 of the second transverse grooves of the second circumferential rib 10 is counter-inclined with respect to the first straight segment 107 of the second transverse grooves 16 of the first circumferential rib 9.

In the embodiment shown in FIGS. 4-6, the second circumferential grooves 17 of the second circumferential rib 10 are positioned so that the distance d between each other is substantially equal to the distance between the second transverse grooves 16 of the first circumferential rib 9.

The second transverse grooves 17 are substantially parallel one another at least along a portion thereof. Preferably, they are substantially parallel one another along their whole extension.

Preferably, the second transverse grooves 17 of the second circumferential rib 10 have a not-constant depth but a stepped profile. In other words, as shown in FIG. 3, they exhibit a central area having the maximum depth and located in the middle of the second circumferential rib 10 and two portions 48 having smaller depths and located axially external with respect to the central one. The two portions 48 with smaller depths have a short axial extension and are located next to the circumferential grooves 4 and 5.

Such stepped profile of the second transverse grooves 17 provides stiffness to the block 14 at one of its ridges so as to prevent or anyway reduce the occurrence of uneven wear.

Referring to the embodiments of FIGS. 4 and 6, each block 15 of the third circumferential rib 11 is axially delimited by two segments of the circumferential grooves 305 and 306 and circumferentially delimited by two second transverse grooves 18.

Still referring to the embodiments shown in FIGS. 4 and 6, each second transverse groove 18 of the third circumferential rib 11 has a centerline provided with at least one first straight segment 107 and one second straight segment 106.

The second straight segment 106 has a length substantially smaller than the length of the first segment 107. The first straight segment 107 preferably has an extension greater than 50%, and preferably smaller than 95% of the total extension of the second transverse grooves 18.

The first segment 107 preferably has an inclination α≥45°, more preferably α≥60°, relative to the equatorial plane X-X.

Advantageously, the first segment 107 preferably has an inclination α<90° relative to the equatorial plane X-X.

The second segment 106 has an extension smaller than 20% of the total extension of the second transverse grooves 18.

In the embodiment shown in FIGS. 4 and 6, the second straight segment 106 is counter-inclined relative to the first segment 107.

In the embodiment shown in FIGS. 4 and 6, the first segment 107 of the second transverse grooves 18 of the third circumferential rib 11 is counter-inclined with respect to the first segment 107 of the second transverse ribs 17 of the second circumferential rib 10.

On the contrary, the first segment 107 of the second transverse grooves 18 of the third circumferential rib 11 has a concordant inclination with respect to the first segment 107 of the second transverse grooves 16 of the first circumferential rib 9.

The centerlines of second transverse grooves 18 are parallel one another at least along a portion thereof. Preferably, they are substantially parallel one another along their whole extension.

In the embodiment shown in FIGS. 4 and 6, the second transverse grooves 18 of the third circumferential rib 11 are positioned so as to have a distance d/2 between each other with respect to the distance between the transverse grooves 16 of the circumferential rib 9.

Preferably, the second transverse grooves 18 of the third circumferential rib 11 have a not constant depth but a stepped profile. In other words, as shown in FIG. 3, they exhibit a central area having the maximum depth and located in the middle of the third circumferential rib 11 and two portions 58 having smaller depths and located axially external with respect to the central one. The two portions 58 with smaller depths have a short axial extension and are located next to the circumferential grooves 5 and 6.

Such stepped profile of the second transverse grooves 18 provides stiffness to the block 15 at one of its ridges so as to prevent or anyway reduce the occurrence of uneven wear.

In the embodiments shown in FIGS. 4-6, the outer ridge 45 of the first circumferential rib 9, facing the first shoulder portion L2, is rounded. Such characteristic works against uneven wear of the axially external ridge 45 of the first circumferential rib 9.

Similarly, also the outer ridge 46 of the circumferential rib 10, facing the first shoulder portion L2, is rounded.

The tread shown in FIG. 5 is a modification of the one in FIGS. 4 and 6 and similar parts are referred to by the same numerals. The tread 2 of FIG. 5 is completely similar to the tread 2 of FIGS. 4 and 6 except for the third circumferential rib 11 and, in particular, the second transverse grooves 18 obtained therein.

In this embodiment, the second transverse grooves 18 do not extend over the whole width of the third circumferential row 11, but over less than 80%, preferably about 50-60%, of the width of the third circumferential rib 11.

More particularly, the second transverse grooves 18 may extend from the circumferential groove itself up to about 50-60% of the width of the third circumferential rib 11. Preferably, they alternately extend in a circumferential direction from circumferential grooves 5, 6 that are axially opposite to the third circumferential rib 11.

In other words, in the circumferential direction if a second transverse groove 18 extends from the second circumferential groove 5 up to about 50% of the width of the third circumferential rib 11, the second transverse groove 18 that is circumferentially consecutive extends from the first circumferential groove 6, and then the alternation is circumferentially repeated.

Such a choice provides the third circumferential rib 11 with a greater stiffness, by decreasing the void-to-rubber ratio thereof.

FIG. 6 shows a tread 2 which is a modification of the one in FIG. 4 wherein similar parts are referred to by the same numerals. The tread of FIG. 6 is in every way similar to the tread of FIG. 4 except for the shape of the second grooves 16 of the first circumferential rib 9 and for the first shoulder portion L2.

In this embodiment, the width of the second transverse grooves 16 of the first circumferential rib 9 is not-constant over their whole extension, but is greater in a first portion 68 thereof.

Preferably, at least one surface portion of the first portion 68 has a width greater than 2 mm, more preferably smaller than 5 mm.

Preferably, the first portion 68 of the second grooves 16 is not extended over the whole width of the circumferential row 9. In the embodiment of FIG. 6, it only extends over about 50% of the width of the first circumferential rib 9.

Also the fourth transverse grooves 34 at least in one surface portion thereof, located in the first shoulder portion L2, have a width greater than 2 mm, preferably smaller than 5 mm.

In addition, as previously disclosed, in the embodiment shown in FIG. 6, one end of the first transverse grooves 56 located in the first shoulder portion L2 is apart from the first circumferential groove 3.

The embodiment shown in FIG. 7, as previously mentioned, comprises two circumferential ribs 10, 11 in the central portion L1.

Preferably, the second transverse grooves 17, 18 are not extended over the whole width of the circumferential ribs 10, 11.

Preferably, according to this embodiment, the second transverse grooves 17, 18 extend at most over 80%, preferably at most 60%, of the width of the circumferential rib in which they are located.

The second transverse grooves 17 of the first circumferential rib 10 extend from the circumferential groove 5 towards the equatorial plane X-X.

Each second transverse groove 17 of the first circumferential rib 10 has a centerline having preferably an inclination $\alpha \geq 45°$, more preferably $\alpha \geq 60°$, relative to the equatorial plane X-X.

Advantageously, the centerline of the second transverse groove 17 of the circumferential rib 10 has an inclination $\alpha < 90°$ relative to the equatorial plane X-X.

According to this embodiment, the second circumferential grooves 17 of the first circumferential rib 10 are positioned so as to have substantially the same distance d from each other.

The second transverse grooves 17 are substantially parallel one another at least along a portion thereof. Preferably, the second transverse grooves 17 are substantially parallel one another along their whole extension.

Preferably, the second transverse grooves 17 of the first circumferential rib 10 have a not-constant depth but a stepped profile. In other words, they comprise a central area having the maximum depth and located in the middle of the first circumferential rib 10 and one portion having smaller depth and located axially external with respect to the central one. The portion with smaller depth has a short axial extension and is located close to the first circumferential groove 5.

Still according to this embodiment, the first circumferential rib 10 has a plurality of fifth transverse grooves 35 having an extension smaller than 35% of the width of the first circumferential rib 10.

The fifth transverse grooves 35 may extend from the first circumferential groove 5 and are alternately arranged with respect to the second transverse grooves 17 without intersecting the latter.

Preferably, the fifth transverse grooves 35 extend parallel to the second transverse grooves 17.

The fifth transverse groove 35 can have a maximum width smaller than about 3 mm, preferably smaller than about 2 mm.

The fifth transverse grooves 35 can substantially have a distance d between each other.

Still according to this embodiment, the second circumferential grooves 18 of the second circumferential rib 11 are positioned so as to have substantially the same distance d/2 from each other.

Furthermore, according to this embodiment, the second transverse grooves 18 of the second circumferential rib 11 are not parallel but counter-inclined with respect to each other.

In detail, each second transverse groove 18 is counter-inclined with respect to the second transverse groove adjacent in a circumferential direction.

Moreover, still according to this embodiment, each second transverse groove 18 extends from a circumferential groove 5 or 6.

Advantageously, the centerline of the second transverse groove 18 of the first circumferential rib 10 has an inclination $\alpha \geq 45°$, more preferably $\alpha \geq 60°$, relative to the equatorial plane X-X.

Preferably, the outer ridge 54 of the first circumferential rib 10 facing the first shoulder portion L2 is rounded. Such characteristic works against uneven wear of the outer ridge 54 itself.

Another embodiment, not shown in figures, comprises a central portion L1 in every way similar to the central portion L1 of FIG. 7, but comprising an additional circumferential rib, substantially without transverse grooves, located between the first circumferential groove 3 and the circumferential rib 10.

According to different embodiments of the invention, different samples of the tyre have been made, in particular having the tread of FIG. 6 (invention 1) and having the tread of FIGS. 4-5 (invention 2).

Different sets of tyres were subjected to comparison tests with some sets of equally sized PZero™ tyres manufactured by the Applicant.

Various sport cars used in the tests were first equipped with four tyres of the invention and then with four comparison tyres.

Straight stretch and cornering aquaplane tests, braking tests on dry and wet road surfaces, drive behavior tests on dry and wet road surfaces, noise tests inside and outside the car and comfort tests, have been carried out.

The straight stretch aquaplane test has been carried out on a straight stretch of smooth asphalt having a predetermined length (100 m) covered with a water layer having a predetermined constant height (7 mm) automatically restored any time the tested car went past. During the test, the vehicle goes into the water layer at a predetermined speed (about 70 Km/h) in total grip conditions, and accelerates until it completely loses grip.

The cornering aquaplane test has been carried out on a track stretch of smooth and dry asphalt at a bend of constant radius (100 m) having a predetermined length and comprising, in a final stretch, an area of predetermined length (20 m) flooded with a water layer having a predetermined thickness (6 mm). The test has been carried out at constant speed, with different speeds.

During the test, the maximum centrifugal acceleration and the maximum speed of the car when the total aquaplane occurs, are detected.

The braking test is performed both under wet and dry road conditions with tyres equipping a vehicle provided with an antilock braking system (ABS) of the wheels.

This braking test was carried out on a straight stretch of asphalt, both under dry and wet conditions, and the stopping distance at a predetermined starting speed, typically 100 km/h under dry conditions and 80 Km/h under wet conditions, has been detected.

The travelling behavior test, under dry and wet surface conditions, is carried out on predetermined tracks, typically tracks closed to traffic. By simulating some characteristic manoeuvres (such as lane changing, overtaking, slalom between cones, entering and exiting a corner) at a constant speed as well as while accelerating and decelerating, the test driver evaluates the performances of the tyre by giving the latter a numerical appraisal during the above mentioned manoeuvres.

The comfort evaluation was appraised considering the sensations the test driver perceived as regards the tyre ability to absorb the roughness of the road surface.

The subjective noise test has been carried out at decreasing speeds from 120 Km/h (or a speed compatible with the power and streamlined noise the car emits, anyway not less than 100 Km/h) to 0 Km/h with the gearshift in neutral, the engine and the air-conditioning unit off (if possible) and the windows closed.

The loudness (sound level and frequency as a speed function) of the tread blocks has been evaluated. The best tyre minimizes all the described sound components when the speed changes.

The homologation noise test is carried out on predetermined outside tracks by positioning two microphones spaced one from another such that the vehicle can pass between them. In order to perform each measurement, the vehicle has to travel a predetermined stretch in a straight line to pass between the two microphones so as to have the longitudinal mid-plane of the vehicle as close as possible to the straight line passing through the centerline of the distance between the two microphones.

The driver has to put into neutral gear and turn the engine off before the front part of the vehicle intersects the line joining the two microphones. Values of the testing speed can change according to the type of tyre, being generally between 70 and 90 Km/h.

The test results are shown in Table I wherein ratings are in percentage values and values referring to the comparison tyre are set to 100.

TABLE I

| | Comparison | Invention 1 | Invention 2 |
|---|---|---|---|
| Aquaplane during cornering | 100 | 110 | 108 |
| Aquaplane in straight stretch | 100 | 106 | 110 |
| Subjective noise | 100 | 102 | 106 |
| Homologation noise | 100 | 110 | 110 |
| ABS braking on dry surface | 100 | 110 | 105 |
| ABS braking on wet surface | 100 | 105 | 104 |
| Behavior on dry surface | 100 | 105 | 110 |
| Behavior on wet surface | 100 | 100 | 102 |
| Comfort | 100 | 101 | 100 |

In Table I, values greater than 100 show an improvement with respect to the comparison tyre.

The test results show that the tyre of the invention has a generally better behavior.

The Applicant believes that such a result, in particular in regard to the behavior tests, at least partly owes to the tread pattern according to the invention, since it allows the footprint area to deform very gradually and progressively. For example, during cornering with sudden load transfer with vehicles provided with suspensions having a high camber angle, especially at the rear tyres, the Applicant believes that the tread pattern allows to achieve a shape of the footprint area at the most substantially mirrored with respect to the one shown in FIG. 1, i.e. longer on the outer side of the tyre and tapered on the inner side thereof but without total loss of grip.

The invention claimed is:

1. A car tyre having a tread, comprising:
    a central portion located across an equatorial plane;
    a first shoulder portion located towards an outer side of the tyre; and
    a second shoulder portion located towards an inner side of the tyre,
        the central portion being separated from said shoulder portions by two first circumferential grooves having a respective width in a range between about 5 mm and about 16 mm,
    wherein:
        said first shoulder portion and said second shoulder portion comprise a plurality of first transverse grooves having a first end located substantially at a respective edge of the tread, having a width greater than or equal to about 4 mm and an axial extension equal to at least 50% of the width of the shoulder portion in which they are located,
        said two first circumferential grooves are a first circumferential groove facing towards the outer side of the tyre and a first circumferential groove facing towards the inner side of the tyre, the first circumferential groove facing towards the outer side of the tyre having a width smaller than the width of the first circumferential groove facing towards the inner side of the tyre,
        the number of said first transverse grooves of the first shoulder portion is lower than the number of said first transverse grooves of the second shoulder portion,
        said central portion comprises at least two straight second circumferential grooves that in combination with the two first circumferential grooves define three circumferential ribs,
        said three circumferential ribs comprise a central circumferential rib that passes through the equatorial plane, an outer circumferential rib positioned towards the outer side of the tyre, and an inner circumferential rib positioned towards the inner side of the tyre,
        each rib of the three circumferential ribs comprises a respective plurality of blocks circumferentially defined by second transverse grooves that extend over an entire width of said rib,
        each of a number of the second transverse grooves of the outer circumferential rib and a number of the second transverse grooves of the central circumferential rib is equal to the number of said first transverse grooves of the first shoulder portion,
        a number of the second transverse grooves of the inner circumferential rib is equal to the number of said first transverse grooves of the second shoulder portion, and
        said second transverse grooves have a maximum width smaller than or equal to about 3 mm and define in each of said three circumferential ribs a void-to-rubber ratio smaller than 0.06.

2. The tyre according to claim 1, wherein said tread comprises a module which is cyclically repeated along the circumferential development of the tyre, and wherein for each module of the tread the number of first transverse grooves of the second shoulder portion is about twice the number of first transverse grooves of the first shoulder portion.

3. The tyre according to claim 1, wherein said second transverse grooves comprise a first substantially straight segment extending over at least 50% of the total extension of the second transverse grooves, said first substantially straight segment having an inclination α>45° relative to the equatorial plane.

4. The tyre according to claim 3, wherein said first substantially straight segment has an extension smaller than 95% of the total extension of the second transverse grooves.

5. The tyre according to claim 3, wherein said second transverse grooves comprise a second substantially straight segment extending at most over 20% of the total extension of the second transverse grooves, said second substantially straight segment being counter-inclined relative to the first segment.

6. The tyre according to claim 1, wherein in each circumferential rib, the second transverse grooves are located at a spacing of between 25 mm and 80 mm in circumferential direction.

7. The tyre according to claim 6, wherein one said spacing in the rib of the central portion closest to the inner side of the tyre is smaller than another said spacing in the rib of the central portion closest to the outer side of the tyre.

8. The tyre according to claim 1, wherein each circumferential rib of the central portion has a set void-to-rubber ratio, said void-to-rubber ratio being greatest for a rib closest to the inner side of the tyre.

9. The tyre according to claim 1, wherein said second circumferential grooves have a width greater than 12 mm.

10. The tyre according to claim 1, wherein said first and/or second circumferential grooves have a maximum depth greater than 5 mm.

11. The tyre according to claim 1, further comprising a third circumferential groove located on the first shoulder portion, the third circumferential groove having a width smaller than the width of the first circumferential groove facing towards the outer side of the tyre.

12. The tyre according to claim 11, wherein said third circumferential groove has a width smaller than 4 mm.

13. The tyre according to claim 11, wherein said third circumferential groove has a maximum depth smaller than 4 mm.

14. The tyre according to claim 11, wherein the plurality of first transverse grooves of the first shoulder portion traverse the third circumferential groove.

15. The tyre according to claim 1, wherein the plurality of first transverse grooves of the first shoulder portion have a second end that reaches the first circumferential groove facing towards the outer side of the tyre.

16. The tyre according to claim 1, wherein each rib of the three circumferential ribs is a straight rib.

17. The tyre according to claim 1, wherein transverse grooves of each of the three circumferential ribs consist of the second transverse grooves that extend over the entire width of said rib.

18. A car tyre having a tread, comprising:
a central portion located across an equatorial plane;
a first shoulder portion located towards an outer side of the tyre; and
a second shoulder portion located towards an inner side of the tyre,
the central portion being separated from said shoulder portions by two first circumferential grooves having a respective width in a range between about 5 mm and about 16 mm,
wherein:
said first shoulder portion and said second shoulder portion comprise a plurality of first transverse grooves having a first end located substantially at a respective edge of the tread, having a width greater than or equal to about 4 mm and an axial extension equal to at least 50% of the width of the shoulder portion in which they are located,
said two first circumferential grooves are a first circumferential groove facing towards the outer side of the tyre and a first circumferential groove facing towards the inner side of the tyre, the first circumferential groove facing towards the outer side of the tyre having a width smaller than the width of the first circumferential groove facing towards the inner side of the tyre,
the number of said first transverse grooves of the first shoulder portion is lower than the number of said first transverse grooves of the second shoulder portion,
said central portion comprises at least two straight second circumferential grooves that in combination with the two first circumferential grooves define three circumferential ribs,
said three circumferential ribs comprise a central circumferential rib that passes through the equatorial plane, an outer circumferential rib positioned towards the outer side of the tyre, and an inner circumferential rib positioned towards the inner side of the tyre,
the central circumferential rib comprises a plurality of blocks circumferentially defined by second transverse grooves that extend over an entire width of said rib,
a number of the second transverse grooves of the central circumferential rib is equal to the number of said first transverse grooves of the first shoulder portion, and
said second transverse grooves have a maximum width smaller than or equal to about 3 mm and define in the central circumferential rib a void-to-rubber ratio smaller than 0.06.

19. A car tyre having a tread, comprising:
a central portion located across an equatorial plane;
a first shoulder portion located towards an outer side of the tyre; and
a second shoulder portion located towards an inner side of the tyre,
the central portion being separated from said shoulder portions by two first circumferential grooves having a respective width in a range between about 5 mm and about 16 mm,
wherein:
said first shoulder portion and said second shoulder portion comprise a plurality of first transverse grooves having a first end located substantially at a respective edge of the tread, having a width greater than or equal to about 4 mm and an axial extension equal to at least 50% of the width of the shoulder portion in which they are located,
said two first circumferential grooves are a first circumferential groove facing towards the outer side of the tyre and a first circumferential groove facing towards the inner side of the tyre, the first circumferential groove facing towards the outer side of the tyre having a width smaller than the width of the first circumferential groove facing towards the inner side of the tyre, the number of said first transverse grooves of the first shoulder portion is lower than the number of said first transverse grooves of the second shoulder portion, said central portion comprises at least two straight second circumferential grooves that in combination with the two first circumferential grooves define three circumferential ribs, said three circumferential ribs comprise a central circumferential rib that passes through the equatorial plane, an outer circumferential rib positioned towards the outer side of the tyre, and an inner circumferential rib positioned towards the inner side of the tyre, each rib of the three circumferential ribs comprises a respective plurality of blocks circumferentially defined by second transverse grooves that extend over an entire width of said rib, a number of the second transverse grooves of the outer circumferential rib is equal to the number of said first transverse grooves of the first shoulder portion, a number of the second transverse grooves of the inner circumferential rib is equal to the number of said first transverse grooves of the second shoulder portion, and said second transverse grooves have a maximum width smaller than or equal to about 3 mm and define in each of said three circumferential ribs a void-to-rubber ratio smaller than 0.06.

* * * * *